US005610662A

United States Patent [19]
Hackett

[11] Patent Number: 5,610,662
[45] Date of Patent: Mar. 11, 1997

[54] METHOD AND APPARATUS FOR REDUCING CONVERSION ARTIFACTS

[75] Inventor: Andrew Hackett, Klingenthal, France

[73] Assignee: Thomson Consumer Electronics S.A., Courbevoie, France

[21] Appl. No.: 415,066

[22] Filed: Mar. 30, 1995

[30] Foreign Application Priority Data

Mar. 30, 1994 [EP] European Pat. Off. ............ 94400729

[51] Int. Cl.$^6$ ..................................... H04N 7/01
[52] U.S. Cl. ........................ 348/452; 348/448; 348/459
[58] Field of Search ...................... 348/443, 446, 348/445, 451, 452, 459, 458, 911, 448; H04N 7/01, 11/02

[56] References Cited

U.S. PATENT DOCUMENTS

| | | | |
|---|---|---|---|
| 5,060,064 | 10/1991 | Lamnabhi et al. | 348/459 |
| 5,365,273 | 11/1994 | Correa et al. | 348/452 |
| 5,406,333 | 4/1995 | Martin | 348/448 |
| 5,428,399 | 6/1995 | Robinson et al. | 348/459 |
| 5,446,497 | 8/1995 | Keating et al. | 348/452 |
| 5,504,531 | 4/1996 | Knee et al. | 348/452 |

FOREIGN PATENT DOCUMENTS

| | | | |
|---|---|---|---|
| 0567072 | 12/1988 | European Pat. Off. . | |
| 0294962 | 12/1988 | European Pat. Off. | H04N 5/44 |
| 93 402059 | 2/1995 | European Pat. Off. | H04N 5/14 |
| 94 113494 | 4/1995 | European Pat. Off. | H04N 7/01 |
| 94 115733 | 4/1995 | European Pat. Off. | H04N 5/44 |
| WO-A-90 15504 | 12/1990 | WIPO | H04N 5/44 |
| 94/02870 | 3/1995 | WIPO | H04N 7/01 |

*Primary Examiner*—Michael Lee
*Attorney, Agent, or Firm*—Joseph S. Tripoli; Peter M. Emanuel; Frederick A. Wein

[57] ABSTRACT

When film is transmitted by television, the same frame of film is used to generate both interlace television fields. This results in the information carried by the second field being temporally displaced from the original by 20 ms. This displacement gives rise to judder and double image artifacts in the received image. To overcome these defects the intermediate fields are generated from the original film frames by double sided motion compensated interpolation wherein the motion information is calculated using double sided block matching. The invention may be applied either in a television receiver or video signal decoder or in the television studio before the television signal is transmitted.

9 Claims, 4 Drawing Sheets

METHOD AND APPARATUS FOR REDUCING CONVERSION ARTIFACTS

FIELD OF THE INVENTION

The present invention relates to a method and to an apparatus for reducing conversion artifacts when progressive film source images are converted into interlace format of at minimum doubled picture frequency.

BACKGROUND OF THE INVENTION

Conventional 50 Hz television systems transmit one complete image every 1/25th of a second, using a system known as interlace which transmits one half image every 1/50 th of a second, followed by the other half image 1/50th of a second later. Television cameras also operate using this interlace system, and so the original scene captured by the camera is displayed on a receiver with no motion problems. This is represented diagrammatically in FIG. 1. Time T is shown along the horizontal axis with the parallel arrows representing the sampling of the image which consists of alternate first FI1 and second FI2 fields. In this case, one half image is sampled every 1/50th of a second, that is the field period FIP. Horizontal position X is shown along the vertical axis, and the length of the arrows represents the position of the object as it moves. By drawing a line through the tips of the arrows, the trajectory TOO of the object may be observed. For this example, an object is depicted moving horizontally with a constant velocity.

Film, on the other hand, is a sequence of complete images, generated at a rate of one new image every 24 times of a second. When film is transmitted on television systems employing a 50 Hz field rate (e.g., PAL), the projection rate is 25 images a second to give simple compatibility with the television system. Inaccuracies in movement speed and audio pitch are ignored. This is shown in FIG. 2 using the same conventions as for FIG. 1 and a frame period FRP. The same trajectory TOO is traced by the object as it moves across the image.

When film is transmitted by television, at the assumed 50 Hz field rate using a telecine with a pull-down ratio of 2:1, the same frame of film is used to generate both interlace television fields. This results in the information carried by the second field being temporally displaced from the original by 20 ms. This is shown in FIG. 3. This displacement gives rise to two perceptible artifacts in the received image.

The first is a double image, and arises from the expectancy of the human visual system that objects move with a constant or smoothly changing velocity. The brain perceives two objects moving with the same velocity, separated by the distance which the original object travels in 20 ms. This is represented by the double trajectory DTOO drawn through the tips of the arrows. The second artifact is that of "judder" or stroboscopic-like effects, caused by the apparent updating of the position of each object only once every 1/25th of a second, a time interval sufficiently long for individual images to be perceived as such rather than combining together to give the appearance of smooth motion.

SUMMARY OF THE INVENTION

It is one object of the invention to disclose a method for reducing or even eliminating motion judder when progressive source images are displayed in interlace format.

It is a further object of the invention to disclose an apparatus which utilizes the inventive method.

This invention is suited for the removal of film judder in TV systems and may be applied either in a television receiver or video signal decoder or in the television studio before the television signal is transmitted.

To overcome these defects (double images and judder) the intermediate fields are generated from the original film frames by a process of motion compensated interpolation. The motion compensation measures the velocities of moving objects and generates the intermediate fields having moving objects correctly positioned so as to remove the above mentioned artifacts and to create, in this example, a single corrected trajectory CST. This is shown in FIG. 4. Each original first field OFFI is followed by a motion compensated second field MCSFI depicted by a dashed line.

Advantageously, the invention can be used for 100 Hz upconversion of a film source, suitable for display on a TV receiver with 100 Hz scanning. In this case each original first field OFFI is followed by three interpolated fields MCSFI (dashed and dotted lines).

In principle, the inventive method is suited for reducing conversion artifacts when progressive film source images are converted into interlace format of at minimum doubled picture frequency, whereby motion compensated fields of said interlace format are generated between non-motion compensated fields of a preselected type—e.g. each first field Advantageous additional embodiments of the inventive method are resulting from the respective dependent claims.

In principle, the inventive apparatus for reducing conversion artifacts when progressive film source images are converted into interlace format of at minimum doubled picture frequency, includes an interlace-to-progressive converter means which combines each two received fields of said interlace format converted film source images to recreate the original film source image. A motion estimation means calculates motion vectors for each pixel in the recreated images. A subsequent vector post-processing means corrects the motion vectors calculated in the motion estimation means. A double sided motion compensated interpolation means operates on the appropriately delayed recreated images using the corrected motion vectors. A switching means selects either an appropriately delayed field of the received fields of the into interlace format converted film source images or an interpolated output field from the motion compensated interpolation means.

BRIEF DESCRIPTION OF THE DRAWING

The invention is illustrated in the accompanying drawing, wherein.

DETAILED DESCRIPTION

Figure 1:
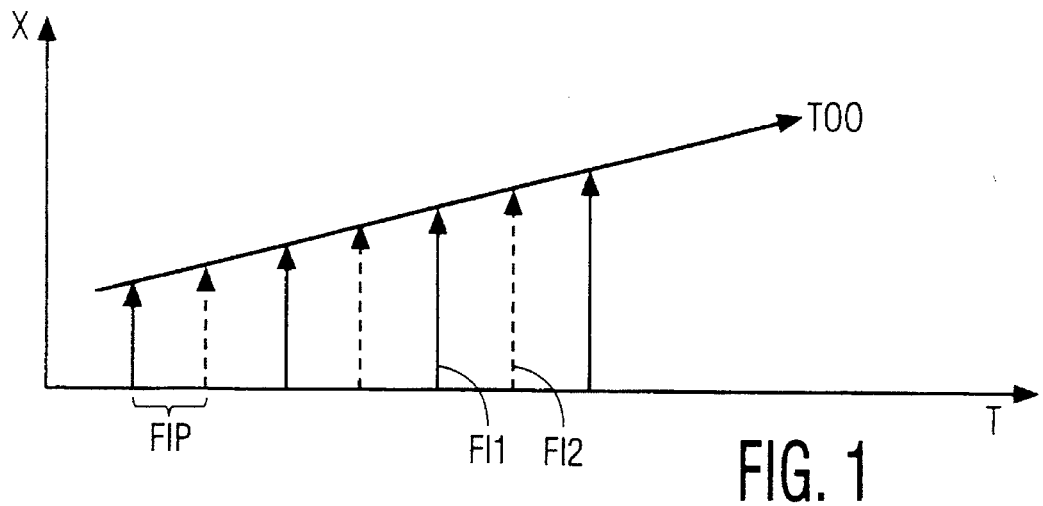
FIG. 1 is a diagram illustrating the trajectory of a moving object in the case of interlaced images from a camera source.
Figure 2:
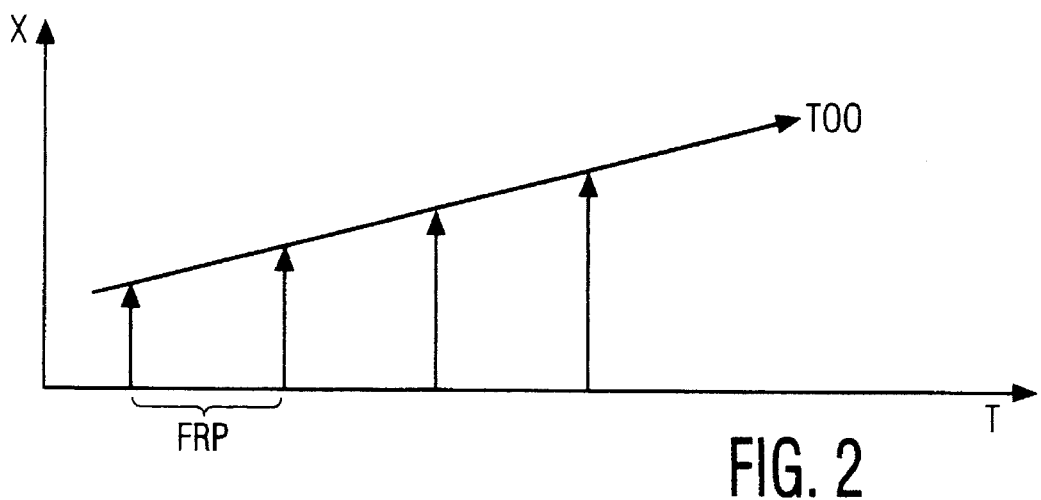
FIG. 2 is a diagram illustrating a trajectory of a moving object in case of images from a film source.
Figure 3:
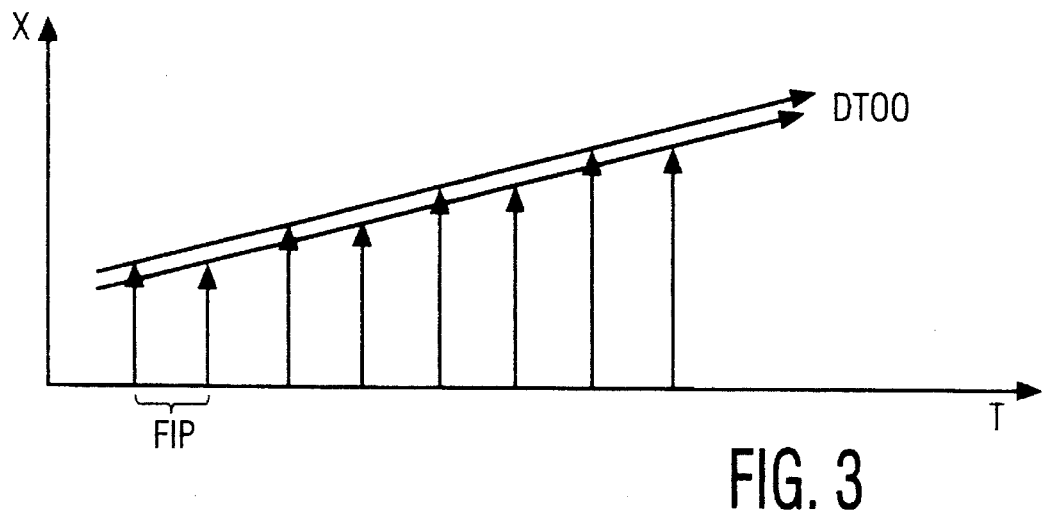
FIG. 3 is a diagram of a trajectory of a moving object in case of interlace-displayed images from a film source.
Figure 4:
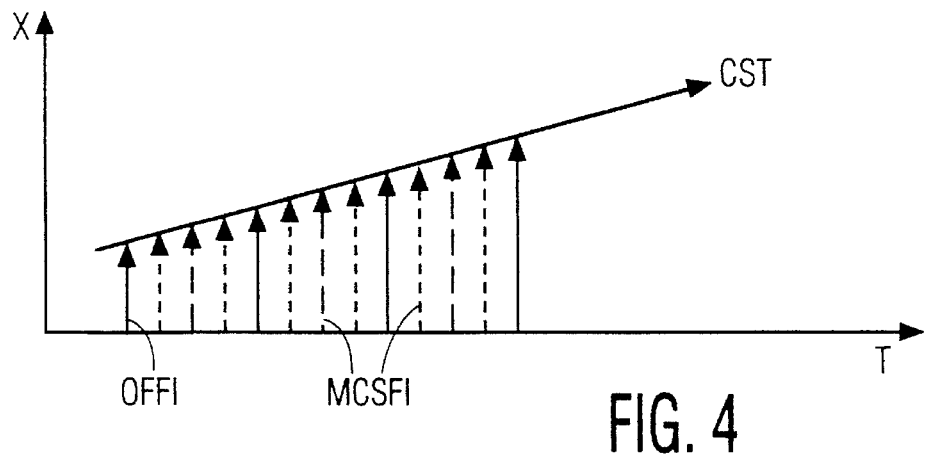
FIG. 4 is a diagram illustrating corrected trajectory of a moving object in case of interlace-displayed images from a film source, wherein every second field or three of four fields are motion compensated.
Figure 5:
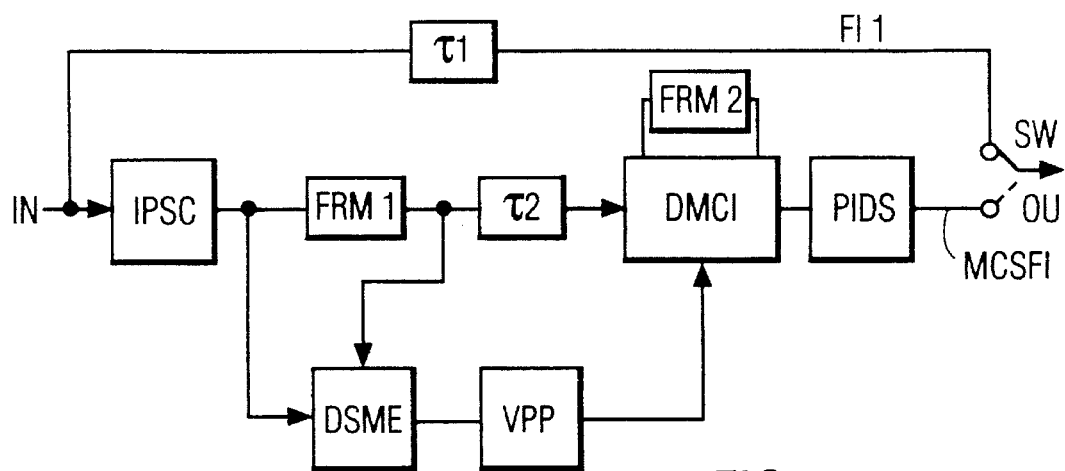
FIG. 5 is a block diagram of apparatus embodying the invention.

One implementation of an inventive apparatus is shown in FIG. 5. In a studio environment this would be placed on the output of a telecine or other film projection device. In a television receiver this would be enabled when film was being transmitted, either by a signaling means external to the video signal, or by a film mode detector, for example that described in EP-A0567072 (see also, Corea et al. U. S. Pat. No. 5,365,273 entitled METHOD AND DEVICE FOR FILM-MODE DETECTION which issued Nov. 15, 1994 and is incorporated herein by reference). In this detector it is checked for every vertically adjacent pixel pair, if the amplitudes of the vertically intermediate pixels of the both adjacent fields lay between the amplitudes of the pixel pair. These comparison results are combined within each field. For setting film mode the combination results must be equal to a specific pattern within a distinct number of fields. The reset criterion is less strong. Within a distinct number of fields a specific number of 'wrong' combination results may occur. The film mode is switched off if this specific number is exceeded.

Figure 6:
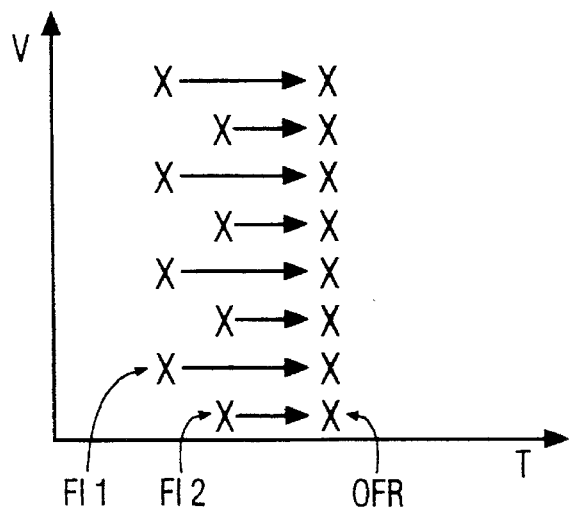
FIG. 6 is a diagram illustrating progressive scan generation from film source being transmitted with interlaced pictures.

The first field, or half image, OFFI of the input signal IN contains the information in the correct temporal position. This field undergoes no further processing and is output directly after a suitable compensating delay t1. The motion compensated second field MCSFI is generated by the subsequent processing. The first processing step is to combine the two received fields in interlace-to-progressive converter means IPCS to recreate the original film image. The function of IPCS is depicted in FIG. 6. Time T is again represented by the horizontal axis. The vertical axis represents the vertical position V. It can be seen that the progressive scan image output frame OFR is recreated by delaying the first field FI1 with respect to the second field FI2 by one field period FIP.

Figure 7:
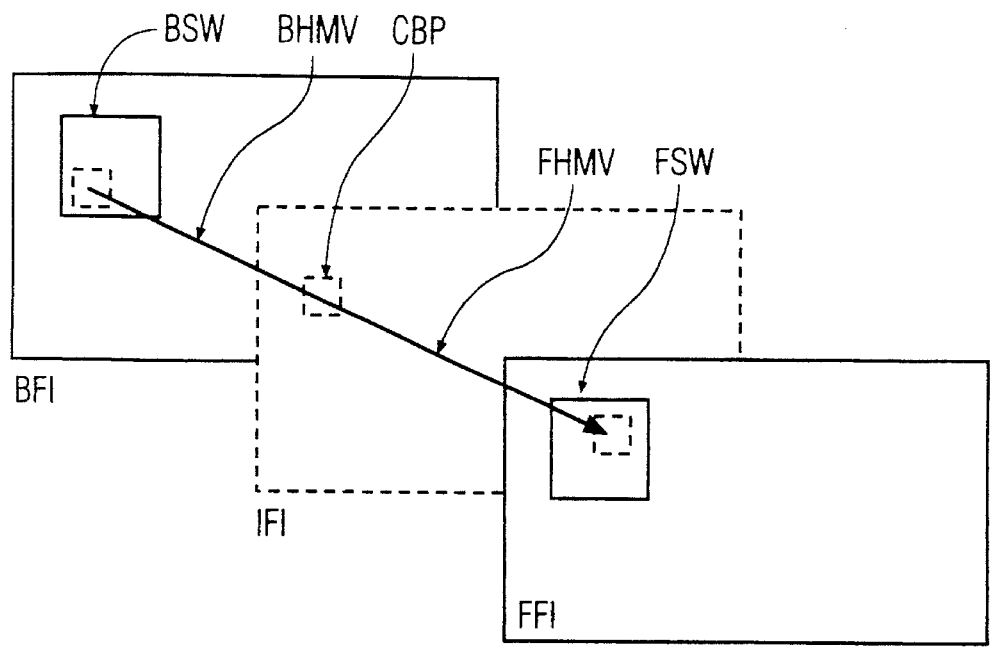
FIG. 7 is a diagram illustrating two-sided block matching.

The next step in the process is to calculate the motion of each point in the image within motion estimation means DSME. This may be done by a number of different means, using different types of motion estimation and a frame memory FRM1. As long as the result of the process is a motion vector associated with each point in the image, centered on the temporal position of the desired output field MCSFI, the precise means to provide these vectors is unimportant aside from the fact that different methods will provide different levels of performance for different costs. In the embodiment described here, this motion estimation is done using double sided motion estimation based on the luminance signal, described fully in published EP-A-93402187 of the applicant. Essentially, this is a full search block matching process with the search window centered on the current block position CBP of the interpolated output field IFI, as shown in FIG. 7. The backward half of the motion vector BHMV has a landing point within the backward search window BSW of a backward field BFI. The forward half of the motion vector FHMV has a landing point within the forward search window FSW of a forward field FFI.

Each successive pixel block CBP of a current field or frame IFI is matched with respective candidate pixel blocks within search window BSW—which has a preselected window width —of the backward field or frame having a half of said preselected width and with the corresponding pixel blocks within the corresponding search window FSW of the forward field or frame having a half of said preselected width in order to select a motion vector, the first part of which is related to the location of the best matching block of the backward field or frame and the second part of which is related to the location of the best matching block of the forward field or frame, whereby the current position of said search windows BSW and FSW is related to the position of the current pixel block of said current field or frame.

The result of this block matching yields a number of candidate vectors for each block which are then post-processed in subsequent vector post-processing means VPP. In this means, the motion vectors are corrected, i.e. are made reasonable, and smoothed.

This can be performed as described in EP-A-93402188 (filed in France Sep. 8, 1993) of the applicant to provide a final output vector for each pixel, representing the best estimate of the motion of that pixel. For this estimation a motion vector related to each block is calculated and for any pixel of the current block, a pixel motion vector is calculated using four motion vectors, that is the motion vector of the current block and the motion vectors of the three adjacent blocks.

For any pixel from error values related to the four block motion vectors several estimated errors can be calculated, taking into account the position of the pixel relative to the center of each of the corresponding blocks, whereby the minimum of said estimated errors is taken to select the related of said four block motion vectors as the final motion vector for said pixel.

Advantageously, the post-processing means VPP may also attempt to correct for the effects of repeated structures as described in EP-A-93402507 and localize the block based motion vectors to provide one motion vector per pixel.

Such correction of motion vectors includes the following steps:

evaluating error values which are related to a matching of said pixel blocks between different pictures of said video signal, whereby, additional to a basic minimum error, a further minimum error belonging to adjacent pixel positions, except directly adjacent pixel positions, is searched along the row, or column, containing the pixel position of said basic minimum error;

comparing said further minimum error with a preselected threshold, resulting in a periodic structure decision if such further minimum error is less then said threshold;

when a periodic structure in the picture content is detected, replacing the current motion vector corresponding to said basic minimum error by a motion vector of an adjacent pixel block, in particular either from the block to the left or from the block above, whichever yields the smaller error in the current block, or by taking the mean of these both vectors.

In addition, a measure of confidence of the motion vector can be generated in VPP on a pixel by pixel basis as described in EP-A93402506 of the applicant. When the confidence is low, there is a high probability that the motion vector is incorrect (for example, on material newly uncovered by the passage of a moving object for which no motion information can be correctly found). In this case, a default motion vector of 0 in both the horizontal and vertical directions is taken.

For such measure of confidence, signal paths with different interpolation processing—in particular motion compensated interpolation and fallback interpolation—are formed, whereby the output signals of said different signal paths are combined in relation to a measure of confidence which is derived from a minimum motion estimation error of the input video signal, which is in particular block based.

DSME may use a non-uniform measurement of candidate motion vectors as described in EP-A-93402059 of the applicant to calculate the motion vectors. The accuracy of this measurement is made non-uniform within the search window by dividing the window into, at minimum, an area of high precision and an area of lower precision, whereby the density of the used pixel values of the input signal for the motion vector calculation is less than in the area of less precision.

The range of the search in both the horizontal and vertical directions is only limited by constraints of cost and complexity.

Figure 8:
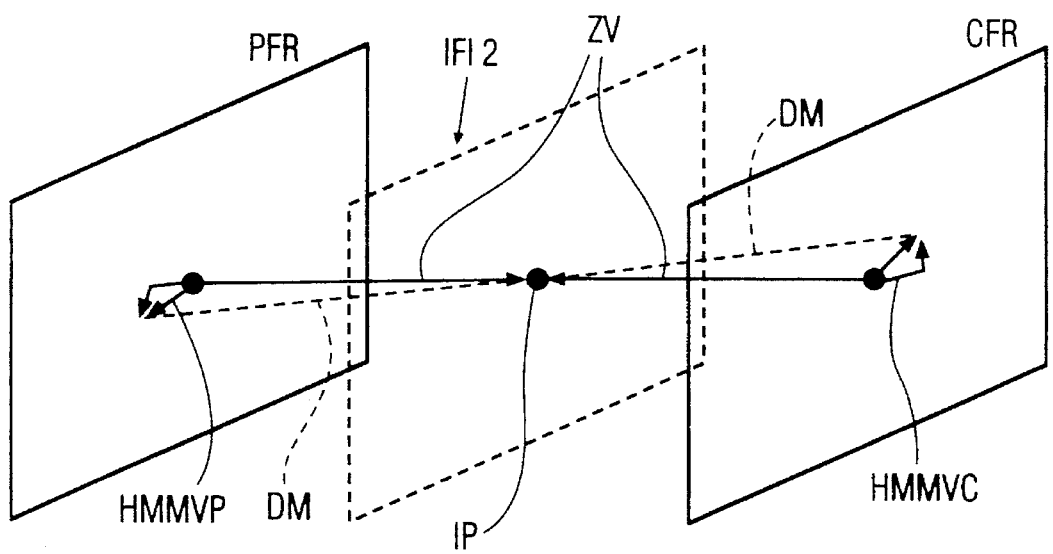
FIG. 8 is a diagram illustrating double sided motion compensation.

The output vectors of VPP are applied to double sided motion compensated interpolation means DMCI, shown in more detail in FIG. 8, which may use a further frame memory FRM2 and which generate from the appropriately delayed (further delay means 12) progressive picture signal a motion compensated output image IFI2 (progressive frame or field) in the temporal position of the second field FI2 of the television image. Each output pixel IP at the position of zero vector ZV is the average of one pixel in the current film frame CFR and one pixel in the previous film frame PFR. The two pixels used in the average are selected by applying the measured motion vector (one half HMMVP in frame PFR and one half HMMVC in frame CFR) for the desired output pixel. If this vector represents accurately the direction of motion DM, these two pixels will correspond to the same part of the same object in each frame.

As shown in this embodiment, a complete progressively scanned image can be generated in the position of field FI2. In case of 100 Hz output DMCI interpolates three intermediate motion compensated output images IFI2 (progressive frames or fields), whereby respective percentages of the components of the motion vectors can be applied to the interpolation of a specific of the three images.

The final step, which may be combined in the interpolator DMCI by directly interpolating a field or three fields only, respectively, is to produce the output field, or fields, MCSFI from the interpolated information. This is done in progressive-to-interlace sub-sampler PIDS by taking every second line from the progressive image.

Switch means SW select either field FI1 or the newly generated field, or fields, MCSFI at the output OU of the inventive apparatus depending on the field being transmitted.

Color information can be handled in exactly the same way as luminance for the interpolation process, using the motion vectors derived for the luminance signal.

Figure 9:
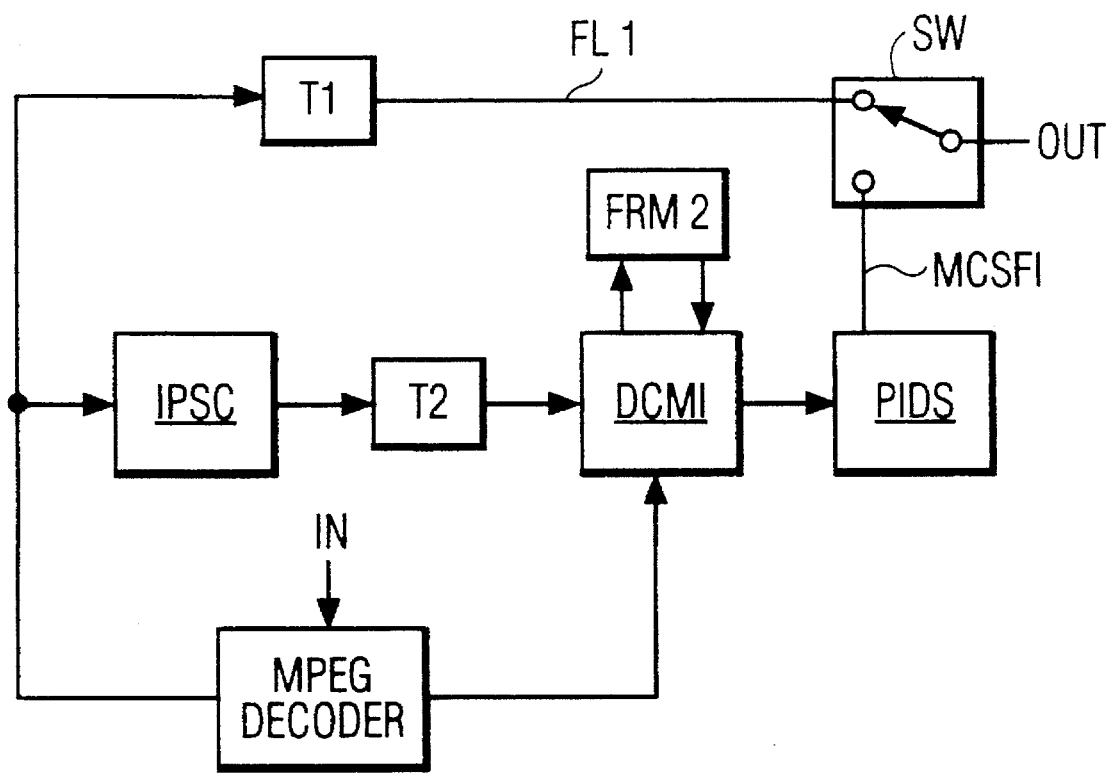
FIG. 9 is a block diagram illustrating a modification of the apparatus of FIG. 5

The invention can also be used in a video signal decoder (TV, VCR, PC, CD-I, CD Video) if the transmitted or recorded signals have been coded using data reduction, e.g. MPEG1 or MPEG2. In such cases the transmitted/recorded motion information can be used in, or instead of, circuits DSME and/or VPP. This is illustrated in FIG. 9 which shows a modification of the apparatus of FIG. 5 for the case wherein the film source images are of digitally coded format using data reduction initially and have been subjected to decoding prior to the conversion by use of a standard decoding process (e.g., MPEG-1 or MPEG-2) having motion compensation information related to the decoding. In this example, the motion compensation information of the standard decoding process (e.g., MPEG) is utilized when generating (DMCI, PIDS) the motion compensated fields (MCSFI) of the interlace format video signal (IN). -IN In case of other film picture rates or field rates (120 Hz) the numbers given can be adapted correspondingly.

When implementing the referenced matters into the invention the length of the therein-described field and frame delays is adapted correspondingly.

The order of usage of the fields can be exchanged, i.e. field 25 OFFI can be the second field FI2.

What is claimed is:

1. A method for reducing conversion artifacts (DTOO) when originally progressive and to interlace format converted film source images are converted into interlace format pictures of, at least, doubled picture frequency, comprising the steps of:

combining (IFSC) each two received fields (FI1, FI2) of said interlace format converted film source images to recreate the original film source images (OFR);

performing (DSME) a full search block matching with a search block position centered on the current block position(CBP) of an output field (IFI) to be interpolated, whereby the backward half of a motion vector (BHMV) to be determined has a landing point within a backward search window (BSW) of a backward field or frame (BFI) of said recreated film source images and the forward half of said motion vector (FHMV) has a landing point within the forward search window (FSW) of a forward field or frame (FFI) of said recreated film source images; generating (DMCI, PIDS), using said motion vectors, motion compensated fields (MCSFI) of said interlace format video signal (IN); and inserting (SW) said motion compensated fields (MCSFI) of said interlace format video signal between non-motion compensated fields (OFFI), of a preselected type, of said interlace format video signal.

2. A method as recited in claim 1 wherein said preselected type of field comprises the first field of each frame of said interlace format video signal.

3. A method as recited in claim 1 further comprising generating and inserting three motion compensated fields (MCSFI) between each pair of said non-motion compensated fields (OFFI).

4. A method as recited in claim 1 further comprising the step of performing said generation of motion compensated fields (MCSFI) in a selected one of a television receiver, a video recorder, a video decoder for correction after transmission or performing said generation of said motion compensated fields in a studio for correction before transmission or recording.

5. A method according to claim 1 wherein the step of generation of motion compensated fields (MCSFI) is performed (DMCI, FRM2, PIDS) using double sided motion compensated interpolation.

6. A method according to claim I wherein said film source images are of a digitally coded format using data reduction initially and have been subjected to decoding prior to said conversion by use of a standard decoding process (e.g., MPEG-1 or MPEG-2) having motion compensation information related to the decoding, and further comprising:

utilizing said motion compensation information of said standard decoding process in the step of generating (DMCI, PIDS) said motion compensated fields (MCSFI) of said interlace format video signal (IN).

7. Apparatus for reducing conversion artifacts (DTOO) when originally progressive film source images are converted into interlace format of at minimum doubled picture frequency, comprising:

interlace-to-progressive converter means (IPCS) for combining each two received fields of said interlace format converted film source images to recreate the original film source image (OFR);

motion estimation means (DSME, FRM1) for generating motion vectors for each pixel in said recreated images (OFR);

subsequent vector post-processing means (VPP) for correcting the motion vectors generated in said motion estimation means;

double sided motion compensated interpolation means (DMCI) for operating on the appropriately delayed (t2) recreated images (OFR) using said corrected motion vectors; and switching means (SW) for selecting either an appropriately delayed (t1) field of said received fields of the interlace format converted film source images or an interpolated output field from said motion compensated interpolation means (DMCI).

8. Apparatus according to claim 7, further comprising:

means for performing full search block matching in said motion estimation means (DSME, FRMI) with a search window centered on the current block position (CBP) of the interpolated output field (IFI), whereby the backward half of the motion vector (BHMV) has a landing point within the backward search window (BSW) of a backward field (BFI) and the forward half of the motion vector (FHMV) has a landing point within the forward search window (FSW) of a forward field (FFI).

9. A method for reducing conversion artifacts (DTOO) when originally progressive film source images are converted into interlace format of at minimum doubled picture frequency, comprising:

combining (IFCS) each two received fields of said interlace format converted film source images to recreate the original film source image (OFR);

generating (DSME, FRM1) motion vectors for each pixel in said recreated images (OFR);

correcting (VPP) said motion vectors;

applying double sided motion compensated interpolation (DMCI) to the appropriately delayed (t2) recreated images (OFR) using said corrected motion vectors; and selecting (SW) either an appropriately delayed (t1) field of said received fields of the interlace format converted film source images or an interpolated output field from said motion compensated interpolation means (DMCI).

* * * * *